Figures 1, 2:
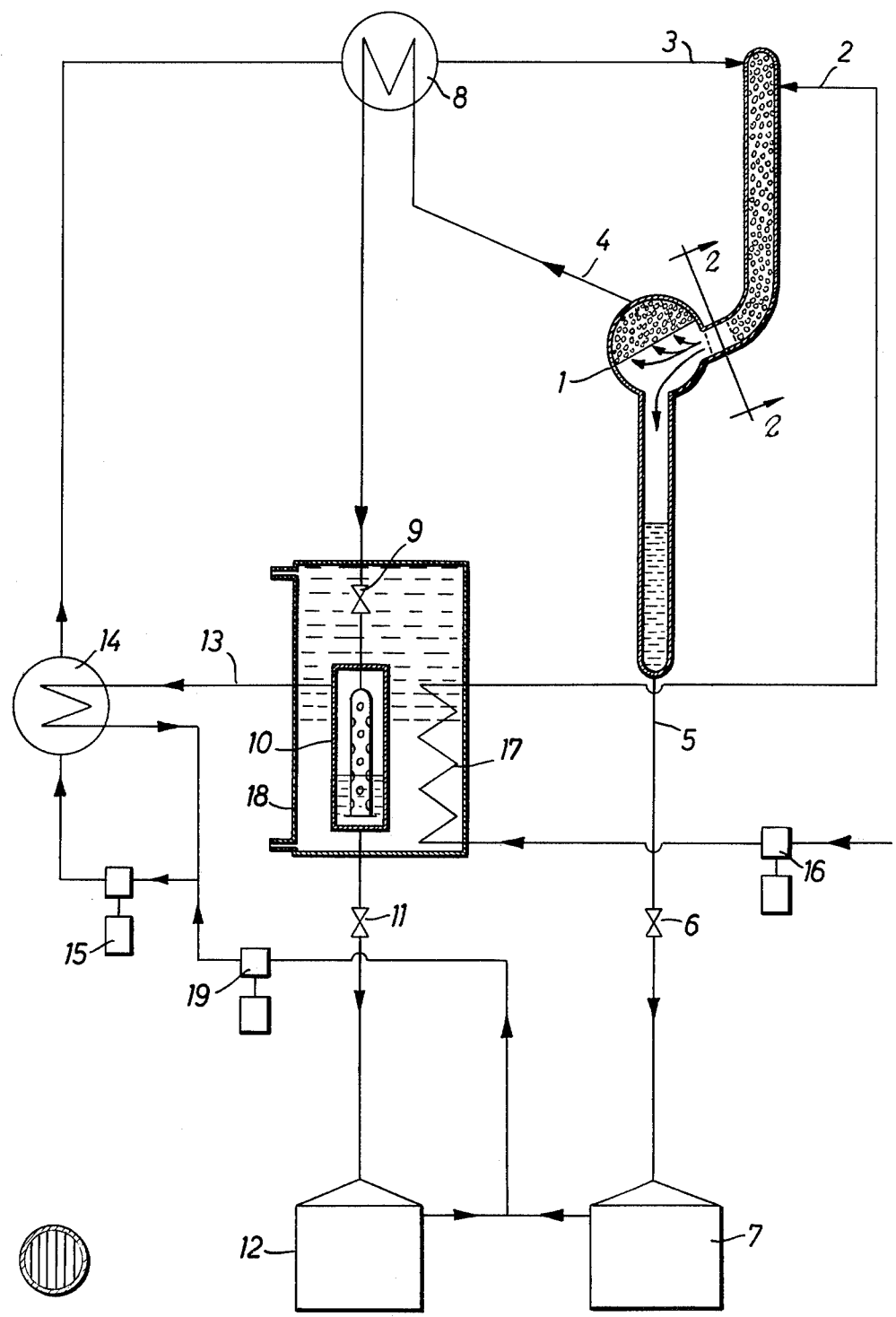

United States Patent [19]

Zosel

[11] 4,201,660

[45] * May 6, 1980

[54] PROCESS FOR THE SEPARATION OF MIXTURES OF VARIOUS HYDROCARBON COMPOUNDS

[75] Inventor: Kurt Zosel, Oberhausen, Fed. Rep. of Germany

[73] Assignee: Studiengesellschaft Kohle mbH, Muhlmann, Fed. Rep. of Germany

[*] Notice: The portion of the term of this patent subsequent to Jul. 13, 1993, has been disclaimed.

[21] Appl. No.: 875,034

[22] Filed: Feb. 3, 1978

Related U.S. Application Data

[63] Continuation of Ser. No. 808,946, Jun. 22, 1977, abandoned, which is a continuation of Ser. No. 734,562, Oct. 21, 1976, abandoned, which is a continuation of Ser. No. 658,657, Feb. 17, 1976, abandoned, which is a continuation of Ser. No. 492,100, Jul. 26, 1974, abandoned, which is a continuation of Ser. No. 113,025, Feb. 5, 1971, abandoned, which is a continuation of Ser. No. 718,959, Apr. 4, 1968, abandoned, which is a continuation of Ser. No. 476,106, Jul. 30, 1965, abandoned.

[30] Foreign Application Priority Data

Aug. 5, 1964 [AT] Austria ................... 6739/64

[51] Int. Cl.² ............... B01D 17/00; C10G 21/14
[52] U.S. Cl. ................. 208/86; 208/251 R; 208/308; 208/309
[58] Field of Search .............. 208/251 R, 308, 309, 208/86

[56] References Cited

U.S. PATENT DOCUMENTS

| | | | |
|---|---|---|---|
| 2,391,576 | 12/1945 | Katz et al. | 208/366 |
| 2,391,607 | 12/1945 | Whaley | 208/354 |
| 2,697,681 | 12/1954 | Murray et al. | 208/86 |
| 2,700,637 | 1/1955 | Knox | 208/86 |
| 2,800,433 | 7/1957 | Read | 208/86 |
| 3,227,645 | 1/1966 | Frumkin et al. | 208/86 |
| 3,507,777 | 4/1970 | Hemminger | 208/309 |
| 3,969,196 | 7/1976 | Zosel | 208/308 |

FOREIGN PATENT DOCUMENTS 113325  9/1958  U.S.S.R. ................... 208/309

OTHER PUBLICATIONS

Zhuze, "Maslob. Zhir. Promst.", 24, 34–37 (1958).

*Primary Examiner*—Herbert Levine
*Attorney, Agent, or Firm*—Sprung, Felfe, Horn, Lynch & Kramer

[57] ABSTRACT

A process for separating petroleum distillation residues into a lower boiling fraction and a higher boiling fraction. The separation is effected with the aid of a process gas under super-critical conditions of temperature and pressure such that the gas selectively takes up the lower boiling fraction. By suitable selection of the gas, the process can be carried out at relatively low temperature, and with low input energy requirements when performed with recycling of the process gas.

42 Claims, 2 Drawing Figures

U.S. Patent

May 6, 1980

4,201,660

PROCESS FOR THE SEPARATION OF MIXTURES OF VARIOUS HYDROCARBON COMPOUNDS

This is a continuation of Ser. No. 808,946 filed June 22, 1977; which is a continuation of Ser. No. 734,562 filed Oct. 21, 1976; which is a continuation of Ser. No. 658,657 filed Feb. 17, 1976; which is a continuation of Ser. No. 492,100 filed July 26, 1974; which is a continuation of Ser. No. 113,025 filed Feb. 5, 1971; which is a continuation of Ser. No. 718,959 filed Apr. 4, 1968; which is a continuation of Ser. No. 476,106 filed July 30, 1965 and which are all now abandoned.

This invention relates to a new process for the separation of mixtures of various hydrocarbon compounds and is especially suitable for the separation of petroleum distillation residues or other higher boiling hydrocarbon materials. The new process can above all be used advantageously for the deasphalting of petroleum distillation residues for the purpose of obtaining purified hydrocarbon fractions which are free from unwanted compounds and which can then be subjected to further processing such as splitting by hydrogenation.

In industry, and especially in the course of petroleum processes, large quantities of higher boiling distillation residues are obtained daily which either cannot be worked up economically, at all, or only under difficult conditions, e.g., during the usual vacuum distillation or known extraction processes. A special problem in this field is the deasphalting of petroleum residues from atmospheric or vacuum distillation. It is known that the highest boiling constituents of the crude oil present in these residues, and especially the asphaltenes contained therein, must be removed to a large extent if the hydrocarbon compounds of these residues are to be subjected to further treatment, for example to catalytic decomposition by hydrogenation. The working up of higher boiling hydrocarbon compounds of petroleum to obtain petroleum and middle oil region is also nowadays of value and importance.

In practice, purification of such distillation residues has previously been carried out either by vacuum distillation or by an extraction process such as the known extraction process with liquid propane. Both methods are relatively costly and involved. The invention provides especially in this case a new method for simple, economic purification of such distillation residues or other higher boiling hydrocarbon materials.

In an earlier patent application (patent application Ser. No. 359,680 filed Apr. 4, 1964, now abandoned replaced by Ser. No. 880,475 filed Dec. 9, 1969), now U.S. Pat. No. 3,969,196, a new separating process for separating mixtures containing organic compounds has been described which is characterized in that the mixture is treated with a gas which is under super-critical conditions of temperature and of pressure. At least a part of the organic compounds are taken up in the super-critical gas phase and, if the mixture of substances is not completely taken up, the charged gas is separated under super-critical conditions from the part of the mixture that has not been taken up and the compounds taken up in the super-critical gas phase are recovered. This new process is based on two important principles; these are, firstly, that it has been found that super-critical gas phases are in principle capable of taking up certain classes of compounds, e.g., organic compounds, in large quantities and, secondly, on the finding that this "uptake capacity" in the super-critical gas is not the same for all compounds but depends on the constitution of the compound. The tendency to enter the super-critical phase therefore differs for different compounds. The greater the uptake capacity of a compound in the super-critical gas, the more rapidly will it go over into the super-critical gas under otherwise comparable reaction conditions, and the greater will be the proportion taken up in a given quantity of the super-critical gas phase. Consequently, when treating a mixture of substances containing constituents that are easily taken up and constituents that are less easily taken up, the constituents more easily taken up are accordingly taken up preferentially by the super-critical gas phase so that they can thus be separated from the constituents that are less easily taken up. It has also been found, inter alia, the molecular weight, which is also reflected in the boiling point, helps to determine the extent to which a compound will be taken up in the super-critical gas phase, the lower boiling compounds of a homologous series being as a rule more easily taken up than the higher boiling compounds of that series.

In said Ser. Nos. 359,680 and 880,475 it has already been pointed out that the new process is especially suitable for the treatment of petroleum and petroleum fractions or comparable hydrocarbon mixtures. The process according to the invention, on the other hand, relates to a particularly economic and important combination of individual features of a process for the working up of petroleum fractions or comparable hydrocarbon mixtures and is especially suitable for economic deasphalting of distillation residues from petroleum distillation.

The present invention provides a separation process, in particular for the deasphalting of petroleum distillation residues or other higher boiling hydrocarbon materials, in which the starting material which is to be separated is treated with a gas which is under super-critical conditions of temperature and of pressure and which has a critical temperature in the range of 90° to 250° C., a part of the starting material is taken up into the overcritical phase, the charged gas phase is separated from the part which has not been taken up and the part of the starting mixture which has been taken up into the gas is recovered by release of pressure and/or increase of temperature. According to the invention, it is preferred to use $C_3$ to $C_6$ hydrocarbon compounds as the super-critical gas phase, and the process is advantageously carried out with $C_3$ and/or $C_4$ hydrocarbon compounds. The most suitable hydrocarbon for the process according to the invention is propane, but propylene is also particularly suitable.

The process according to the invention is thus characterized by a combination in the choice of certain super-critical gases from the large group of gaseous phase which can in principle be used for the new separation process in conjunction with certain higher boiling mixtures of substances which are to be separated. The choice of the super-critical gases is connected with the choice of a starting mixture which in particular cannot be decomposed into its components by simple atmospheric distillation. The reason for this is that it has been found that it is precisely for such high boiling hydrocarbon mixtures that the new separation process is more economical in installation and procedure than the separation and purification processes hitherto known. The costs of installation and operation both of a vacuum distillation plant and of an extraction, for example with liquid propane, are considerably higher than the corresponding costs for the process according to the invention.

It is precisely to this question of economy of the new process that the development according to the invention makes an important further contribution to the new process, the basic principles of which have been described in the above mentioned earlier patents. These are as follows:

The gas phase which is charged under super-critical conditions with a part of the mixture to be separated and is separated from the remainder of the mixture can be at least partly freed from the compounds it has taken up by increase in temperature or by release of pressure since the uptake capacity of the compounds in the super-critical gas drops with increasing temperature of diminishing pressure. Practically complete removal of the compounds taken up is achieved if, for example, the pressure in the gas phase is dropped sufficiently far below the critical pressure. If the compounds taken up are then obtained in the liquid or solid phase, the gas stream which has been freed from its charge can easily be separated and must then be returned to the charging stage operated under super-critical conditions. Thus, if, for example, the compounds taken up are precipitated at least partly by a reduction in pressure, then the gas stream from which these compounds have been removed must again be raised to the super-critical pressure in the charging stage before it can be used again. It will thus be necessary to compress relatively large quantities of gas, and it is well known that this requires extensive installations which are not economical to run.

According to one important feature of the invention presented here, the process described in the earlier patents is decisively improved especially in this respect since according to the invention liquefaction of the gas phase is interposed between the stage of discharging the charged super-critical gas stream by release of pressure and the stage of renewed compression of the discharged gas stream to the super-critical operating pressure in the charging stage. The advantage of this procedure is obvious. It is very much easier and less expensive to compress a given quantity of material in the liquid phase from the low discharging pressures to the higher super-critical operating pressures of the charging stage than to bring the same quantity of material in the gaseous phase from the lower to the higher pressures.

According to the invention, the improvement described can simply be achieved by cooling the gas stream discharged in the desired manner to such an extent that liquefaction takes place. Working up the charged, super-critical gas stream separated from the remainder of the starting material thus takes place in two stages. In the first stage the pressure is lowered, preferably at a super-critical temperature in order to exclude the possibility of unwanted liquefaction of the gas phase, so far below the critical pressure that the constituents taken up are precipitated as desired. The compounds which had been taken up, which according to the invention are now obtained in a separate phase, are separated from the now discharged gas stream. The temperature of this discharged gas stream is then lowered to such an extent below the critical temperature that the gas stream liquefies. The liquid stream thus obtained is again pressurized to the super-critical operating pressure of the charging stage and the liquid thus pressurized is heated to the super-critical operating temperature. Compression of large quantities of gas is in this way avoided by simple means. Another feature which renders the new process more economical is that the transition from the sub-critical into the super-critical state does not involve any significant additional energy changes such, for example, as the latent energy of evaporation required for the transition from the liquid phase into the gaseous phase under sub-critical conditions. For heating the recompressed liquid stream to temperatures in the region of the super-critical operating temperature it is therefore only necessary to provide the energy actually necessary for the increase in temperature but not any additional energy.

Liquefaction of the discharged gas stream can be carried out especially economically and simply if simple conventional cooling devices are sufficiently for bringing about the desired liquefaction, in other words especially if the gas need not be cooled below room temperature. According to the invention it is thus especially preferred, in the discharge of the gaseous phase by release of pressure to sub-critical values, to maintain sufficiently high pressures to enable the gas to liquefy by cooling to room temperature. This is what is meant by the choice of gas phases according to the invention. Propane (critical temperature above 95° C.) lies for example at the lower limit of the region for critical temperatures of the gases used according to the invention. Since at the same time the critical pressure of propane is in the region of 43 atmospheres, satisfactory separation of compounds taken up can be ensured by dropping the pressure to 30 to 40 atmospheres during the pressure release stage. At the same time, these pressures are still sufficiently high to enable propane to liquefy when cooled to temperatures in the region of 20 to 30° C., so that recompression can be carried out in the simple manner described above. It will be obvious that the features of the invention can be utilized in analogous manner for compounds having higher critical temperatures, for example when $C_4$ hydrocarbons are used which accordingly condense at higher temperatures. This is all the more so the higher the critical temperatures are and hence the higher the condensation points of the gas phases used.

Nevertheless, the $C_3$ hydrocarbons as well as the $C_4$ hydrocarbons have a preferential position in the process of the invention since they cannot only be condensed to the liquid phase by being cooled to room temperature but they also have relatively low critical temperatures so that it is possible to work at relatively low temperatures during the charging stage. It is especially the working up of petroleum distillation residues which it is advantageous to carry out in this manner since the charging can be carried out at a temperature at which thermal cracking of constituents of the distillation residue is practically impossible. Herein lies an important advantage, e.g. also in comparison with vacuum distillation since it is thus possible to prevent the occurrence of unwanted breakdown products of lower boiling ranges in the desired fractions of the residue.

It has further been found that charging can also be carried out in a very simple manner. According to the invention, it is preferred, to send the starting material which is to be separated, in other words for example the distillation residue and the super-critical gas stream, in a unidirectional current through a charging zone under the operating conditions of the charging stage. In this procedure, intimate contact between the gas phase and the starting material to be separated is first ensured. This can be effected, for example, by filling the charging zone with filling bodies and passing the mixture of gas phase and starting mixture to be separated through this zone. The uptake of the compounds to be separated in the super-critical gas phase takes place rapidly and it becoms advisable after only a short time to still this mixture of super-critical gas and material to be separated. This can easily be done by ensuring that the stream does not encounter any further obstructions which would lead to whirling up of the stream, and if desired, baffle plates may be arranged in the direction of the stream to convert the turbulent flow into a laminar fow. During this phase of pacifying the stream, the charged gas phase and the remainder of the starting material separate from each other, the starting material which has not been taken up being usually present as the lower liquid phase. In this form, the two phases of the stream of product can easily be branched into different paths to ensure the desired rapid and sure separation. Thus it may be advantageous to conduct the stilled, laminar stream of mixture obliquely downwards into the separating zone in which the charged gas phase is removed at the top while the constituents of the mixture which has not been taken up flow down under the effect of gravity.

According to the invention, it is especially preferred if the super-critical temperatures employed in the chargng and separating zone are such that the starting mixture and preferably also those constituents of the starting mixture that have not been taken up are present in the liquid phase. Further, in accordance with the general information given in the above-mentioned earlier patents, it is preferred to work in the temperature region of up to 100° C. above the critical temperature of the gas employed, preferably in the temperature region of up to 50° C. above the critical temperature. The choice of super-critical gas to be used in any particular case results from the combination of all these conditions and it is found that the use of $C_3$ or $C_4$ hydrocarbons, especially propane, again provides special advantages particularly for the treatment of petroleum distillation residues and comparable high boiling hydrocarbon materials. With propane, which has a critical temperature of about 95° C., it is possible to work e.g. in a temperature region of 100° to 150° C. In this temperature region, distillation residues and the products of the process are sufficiently fluid.

The otherwise generally valid rules for carrying out separations with the aid of super-critical gases are indicated in said Ser. Nos. 359,680 and 800,475 which are, of course, also applicable here. Thus the larger the quantities of compounds that are to be taken up from the mixture per unit quantity of super-critical gas, the higher will be the pressures employed during the procedure of charging above the critical pressure. Using propane as example, it will be explained with the aid of actual values that economic conditions can easily be obtained. Thus when working with propane at pressures of 100 to 150 atmospheres and at temperatures in the region of 100° to 150° C., two parts by weight of the super-critical gas are sufficient for one part by weight of the distillation residue to obtain practically sufficient splitting up of the residue. It is, of course, also possible to employ other proportions. These figures are intended merely to demonstrate the effectiveness of the new process.

In any particular case, a combination of operating pressure, temperature and ratio of gas phase to residue will be chosen which leads to the desired distribution of the mixture to be separated. Above all, the combination of these factors is used to determine the quantity which is not taken up from the mixture to be separated. It is obvious that in this way it is possible to separate the asphaltene-containing high boiling constituents in any desired proportion from the valuable constituents of the starting material.

The data given below concerning the volume-time yields of such a process is also by way of exemplification. It has been found that up to 10 or more parts of distillation residue per unit volume of charging zone and separating zone can easily be put through per hour. Very high rates of throughput can thus be achieved with relatively small separation apparatus, especially in comparison with the process of vacuum distillation.

The super-critical gases used should be inert to the mixture to be separated under the conditions of the process.

In the accompanying drawing:

FIG. 1 is a flow sheet for an embodiment of the process of the invention, illustrating the construction of some of the equipment utilized; and FIG. 2 is a cross-sectional view taken along line 2—2 in FIG. 1.

A working cycle for carrying out the process according to the invention is illustrated diagrammatically in the accompanying flow sheet. The charging and separation apparatus (1) consists of a middle portion, which is here shown to be spherical, a separation zone, an upwardly directed arm which opens into the side of the zone, a charging zone and a discharge outlet which is attached at the bottom and which serves to receive the residue which has not been taken up from the mixture to be separated and which it is conducted from there into a storage tank (7) through the pressure reducing valve (6). The arm serving as charging zone of the part (1) of the apparatus is filled in its upper part with small filling bodies and in its lower part with larger filling bodies. Just before the transition into the spherical separation part, a tubular section is provided which contains vertical baffle plates to still the mixture, i.e., to ensure the desired laminar flow of the mixture conducted through the charging zone. The spherical separation member is separated in the middle by a perforated plate, and filling bodies are arranged above this plate. The downwardly directed receiving tube for the residue which has not been taken up from the mixture to be separated has no installations. The whole arrangement is kept at the desired operating temperature by a heating apparatus (not shown in the drawing).

The material to be separated, a distillation residue containing low and high boiling fractions, preferably pre-heated to the operating temperature, is continuously supplied to the charging zone through the pipe (2). At the same time, the super-critical carrier gas, i.e., the process gas, which is also preferably preheated to the operating temperature, is continuously conducted into the contacting zone through (3) and flows in the same direction as the starting mixture to be separated, first in a turbulent flow and later in a laminar flow into the spherical separatiiong part. The starting material is in liquid state in the contacting zone. On passing through the layer of filling bodies, the carrier gas which is in the super-critical state becomes charged with the constituents to be separated and is continuously removed through the pipe (4). The component which has not been taken up by the super-critical gas phase flows as a liquid into the lower pipe and is removed from there through the pipe (5) and the discharge valve (6). The carrier gas removed through (4) is first conducted into the heat exchanger (8) and then enters the intermediate container (10) through the reducing valve (9). In the reducing valve (9), the pressure is reduced to the sub-critical region. During this operation, the carrier gas becomes separated from the constituents it has taken up by reason of condensation of these constituents (low boiling fraction), and these constituents are deposited at the bottom of the container (10) and removed into the storage container (12) through the valve (11). The reducing valve (9) and the separation container (10) are surrounded by the heating jacket (18) which ensures that sufficiently high temperatures are maintained during this stage of the process to enable the compounds deposited in (10) to be easily separated from the discharge gas phase.

The carrier gas freed from the constituents previously taken up by it is removed through (13) and on passing through the heat exchanger (14) is sufficiently cooled to liquefy. This liquefied gas stream is again raised to the operating pressure in the charging and separating apparatus (1) by means of the liquid pump. The liquid stream again flows under the operating pressure to the heat exchanger (14) but in the reverse direction and subsequently to the heat exchanger (8) again in the reverse direction. During this process, it again goes over into the super-critical state due to the increase in temperature and accordingly enters the separation apparatus (1) through the pipe (3). In the figure, the conditions are slightly simplified in that a 100% heat exchange in the heat exchangers (8) and (14) is, of course, not possible. A certain amount of additional cooling of the gas stream to be liquefied will usually be necessary after the gas has passed through the heat exchanger (14) and consequently also slight additional heating of the returned gas stream after it has passed through the exchanger (8). However, this additional heating and cooling involves only the extremely small quantities of energy which are lost. According to the flow diagram in the figure, the distillation residues to be separated is continuously supplied to the separation apparatus at (2) through the pump (16) and the heating coil (17) which together with the reducing valve (9) and intermediate container (10) are accommodated in the same heating bath (18). Here again, an additional heating stage, not shown in the drawing, can be interposed in series. The quantities of carrier gas which are still present in the products collected in the storage containers (7) and (12) and which escape during the release of pressure are liquefied by the compressor (19) and carried to the input end of the pump (15).

In a special experimental procedure, the charging and separation apparatus (1) consists of two iron pipes of about 5 cm internal width and 1 m length which, as shown in the figure, are welded into a spherical container at an angle of about 120°. The upper, bent pipe is filled at the top with filling bodies 4 mm in diameter, at the bend with balls of 1 cm in diameter and lastly, at the opening into the spherical part, it is provided with the baffle plates shown in section. The spherical separation part consists of two flanged dishes welded together and is filled with balls of 1 cm in diameter above the perforated plate arranged in the middle. The charging stage is carried out with propane as carrier gas at an operating temperature of 120° to 130° C. and pressures between 90 and 150 atmospheres. During the discharging stage, the pressure is reduced to 30 to 35 atmospheres so that the discharged propane can still be liquefied above room temperature. The volumetric capacity of the whole separation apparatus (1) is about 5 liters. Under these conditions, 25 to 50 liters of distillation residue can be separated per hour into asphalt and high boiling petroleum constituents. The higher the pressure, the more extensive is the separation.

It is especially in this last property of the products of the process that the new process has a great importance for the working up of residues form petroleum distillation. It is known that vanadium compounds are extremely undesirable in the products of the process because they can not only interfere with further working up but above all can give rise to severe corrosion during the combustion of the hydrocarbon compounds. The conventional working up processes therefore contain a special stage for the removal of vanadium. According to the invention, this is not necessary.

The separated petroleum constituents are largely ash-free and contain only traces of vanadium compounds.

What is claimed is:

1. A process for the separation of petroleum distillation residues containing lower boiling fraction and higher boiling fraction, which comprises the steps:
   (a) contacting said residue in liquid state with a process gas under super-critical conditions of temperature and pressure of the gas such that the gas will take up at least a portion of said mixture in a quantity varying inversely with said temperature, and effecting said contacting in a manner so that this occurs, said gas having a critical temperature of 90°–250° C. and being inert to the distillation residue, so that a portion of the lower boiling fraction is taken up by the process gas, whereby there is formed a gas phase containing process gas and lower boiling fraction taken up by the process gas, and a liquid hase containing higher boiling fraction of said distillation residue, said contacting being at a temperature up to 100° C. above the critical temperature,
   (b) separating the gas phase from the liquid phase, while still maintaining super-critical conditions as aforesaid, thereafter
   (c) condensing at least part of the lower boiling fraction from the gas phase by reducing the pressure,
   (d) separating condensed lower boiling fraction from the two phase mixture resulting from the condensation,
   (e) after separating the lower boiling fraction, cooling the process gas resulting from the separation to liquefy the process gas,
   (f) pressurizing the liquefied process gas to the super-critical pressure employed in step (a),
   (g) heating the pressurized liquefied process gas to the super-critical temperature employed in step (a) to convert it to process gas at the super-critical temperature and pressure used in step (a), in said heating supnlying only energy to raise the temperature,
   (h) employing the process gas produced in step (g) in the contacting of step (a).

2. A process as claimed in claim 1 in which the process gas is of the group $C_3$ to $C_6$ hydrocarbons.

3. A process as claimed in claim 1 in which the process gas is of the group $C_3$ and $C_4$ hydrocarbons.

4. Process according to claim 1, wherein propane is the process gas.

5. Process according to claim 1 for the separation of petroleum in which low boiling fraction is condensed from the gas phase by reducing the pressure to a value sufficiently high to enable the process gas to be liquefied by cooling to room temperature and effecting said liquefying of the process gas by cooling to a temperature not below room temperature.

6. Process according to claim 1, wherein said heating in step (g) comprises heat exchange with the gas phase resulting from said contacting and heat exchange with the condensate free process gas.

7. Process according to claim 5, wherein said heating in step (g) comprises heat exchange with the gas phase resulting from said contacting and heat exchange with the condensate free process gas.

8. A process as claimed in claim 5 in which the following operating conditions are used: contacting, 100° to 150° C., pressures of at least 100 atmospheres; separating, release of pressure to 30 to 40 atmospheres; liquefaction by cooling to 20° to 30° C.

9. A process according to claim 8, wherein the contacting operating pressure is 100–200 atmospheres.

10. Process according to claim 1, wherein said petroleum distillation residue contains an appreciable amount of vanadium compounds, said lower boiling fraction taken up in the gas phase containing not more than a trace of vanadium.

11. Process according to claim 1, wherein, in the separation of the low boiling fraction, the pressure is reduced to below the critical pressure.

12. Process according to claim 5, wherein, in the separation of the low boiling fraction, the pressure is reduced to below the critical pressure.

13. Process according to claim 1, wherein the process gas is propane, the contacting temperature is 100° to 150° C., contacting pressure is 100 to 150 atmospheres, separating by releasing of pressure to 30 to 40 atoms.

14. Process according to claim 13, wherein liquefaction is by cooling to 20° to 30° C.

15. Process according to claim 1, in which the process gas is of the group $C_3$ and $C_4$ hydrocarbons, the contacting is at a temperature up to 100° C. above the critical temperature, and low boiling fraction is condensed from the gas phase by reducing the pressure to a value sufficiently high to enable the process gas to be liquefied by cooling to room temperature and effecting said liquefying of the process gas by cooling to a temperature not below room temperature.

16. A process for the separation of petroleum distillation residues containing lower boiling fraction and higher boiling fraction, which comprises the steps:
 (a) contacting said residue in liquid state with a process gas under super-critical conditions of temperature and pressure of the gas such that the gas will take up at least a portion of said mixture in a quantity varying inversely with said temperature, and effecting said contacting in a manner so that this occurs, said gas having a critical temperature of 90°–250° C. and being inert to the distillation residue, so that a portion of the lower boiling fraction is taken up by the process gas, whereby there is formed a gas phase containing process gas and lower boiling fraction taken up by the process gas, and a liquid phase containing higher boiling fraction of said distillation residue, said contacting being at a temperature up to 100° C. above the critical temperature,
 (b) separating the gas phase from the liquid phase, while still maintaining super-critical conditions as aforesaid, thereafter
 (c) condensing at least part of the lower boiling fraction from the gas phase by reducing the pressure to a value sufficiently high to enable the process gas to be liquefied by cooling to room temperature,
 (d) separating condensed lower boiling fraction from the two phase mixture resulting from the condensation,
 (e) after separating the lower boiling fraction, cooling the process gas resulting from the separation to liquefy the process gas,
 (f) compressing the liquefied process gas to the super-critical pressure employed in step (a),
 (g) heating the compressed liquefied process gas to the super-critical temperature employed in step (a) to convert it to process gas at the super-critical temperature and pressure used in step (a),
 (h) employing the process gas produced in step (g) in the contacting of step (a).

17. A process according to claim 1, and hydrocracking the separated lower boiling fraction of step (d).

18. A process for the separation of petroleum distillation residues containing lower boiling fraction and higher boiling fraction, which comprises the steps:
 (a) contacting said residue in liquid state with a process gas under super-critical conditions of temperature and pressure of the gas such that the gas will take up at least a portion of said mixture in a quantity varying inversely with said temperature, said gas having a critical temperature of 90°–250° C. and being inert to the distillation residue, so that a portion of the lower boiling fraction is taken up by the process gas, whereby there is formed a gas phase containing process gas and lower boiling fraction taken up by the process gas, and a liquid phase containing higher boiling fraction of said distillation residue, said contacting being at a temperature up to 100° C. above the critical temperature,
 (b) separating the gas phase from the liquid phase, while still maintaining super-critical conditions as aforesaid, and
 (c) following step (b), separating at least part of the lower boiling fraction from the process gas.

19. A process for the separation of petroleum residues containing lower boiling fraction and higher boiling fraction, which comprises the steps:
 (a) contacting said residue in liquid state with a process gas under super-critical conditions of temperature and pressure of the gas such that the gas will take up at least a portion of said mixture in a quantity varying inversely with said temperature, and effecting said contacting in a manner so that this occurs, said gas having a critical temperature of 90°–250° C. and being inert to the distillation residue, so that a portion of the lower boiling fraction is taken up by the process gas, whereby there is formed a gas phase containing process gas and lower boiling fraction taken up by the process gas, and a liquid phase containing higher boiling fraction of said distillation residue, said contacting being at a temperature up to 100° C. above the critical temperature.
 (b) separating the gas phase from the liquid phase, while still maintaining super-critical conditions as aforesaid, and (c) following step (b), separating at least part of the lower boiling fraction from the process gas.

20. A process for the separation of petroleum distillation residues containing lower boiling fraction and higher boiling fraction, which comprises the steps:
(a) contacting said residue in liquid state with a process gas under super-critical conditions of temperature and pressure of the gas such that the gas will take up at least a portion of said mixture in a quantity varying inversely with said temperature, and effecting said contacting in a manner so that this occurs, said gas having a critical temperature of 90°–250° C. and being inert to the distillation residue, so that a portion of the lower boiling fraction is taken up by the process gas, whereby there is formed a gas phase containing process gas and lower boiling fraction taken up by the process gas, and a liquid phase containing higher boiling fraction of said distillation residue, said contacting being at a temperature up to 100° C. above the critical temperature, and
(b) separating the gas phase from the liquid phase, while still maintaining super-critical conditions as aforesaid, and
(c) following step (b), condensing at least part of the lower boiling fraction from the gas phase by reducing the pressure, or increasing the temperature, or reducing the pressure and increasing the temperature, to condense lower boiling fraction and provide a two phase mixture of condensed lower boiling fraction and process gas.

21. A process as claimed in claim 20, in which the process gas is of the group $C_3$ to $C_6$ hydrocarbons.

22. A process as claimed in claim 20, in which the process gas is of the group $C_3$ and $C_4$ hydrocarbons.

23. A process according to claim 20, wherein the gas is propane or propylene.

24. A process according to claim 20, wherein the gas is propane.

25. A process as claimed in claim 20, in which:
(d) said condensed lower boiling fraction is separated from the two phase mixture thereof with process gas,
(e) following said separation in step (d), the process gas is substantially all recycled to step (a).

26. A process according to claim 20, in which:
(d) said condensation is effected by reducing the pressure,
(e) separating condensed lower boiling fraction from the two phase mixture resulting from the condensation,
(f) after separating the lower boiling fraction, cooling the process gas resulting from said separation to liquefy the process gas,
(g) compressing the liquefied process gas to the super-critical pressure employed in step (a).
(h) recycling the compressed process gas to step (a).

27. A process as claimed in claim 20, in which:
(d) said condensation is effected by reducing the pressure,
(e) separating condensed lower boiling fraction from the two phase mixture resulting from the condensation,
(f) after separating the lower boiling fraction, cooling the process gas resulting from said separation to liquefy the process gas,
(g) compressing the liquefied process gas to the super-critical pressure employed in step (a),
(h) heating the compressed liquefied process gas to the super-critical temperature employed in step (a) to convert it to process gas at the super-critical temperature and pressure used in step (a),
(i) employing the process gas produced in step (b) in the contacting of step (a).

28. A process as claimed in claim 27, in which the process gas is of the group $C_3$ to $C_6$ hydrocarbons.

29. A process as claimed in claim 27 in which the process gas is of the group $C_3$ and $C_4$ hydrocarbons.

30. A process for the separation of petroleum distillation residues containing lower boiling fraction and higher boiling fraction, which comprises the steps:
(a) contacting said residue in liquid state with a process gas under super-critical conditions of temperature and pressure of the gas such that the gas will take up at least a portion of said mixture in a quantity varying inversely with said temperature, and effecting said contacting in a manner so that this occurs, said gas having a critical temperature of 90°–250° C. and being inert to the distillation residue, so that a major portion of the lower boiling fraction is taken up by the process gas, whereby there is formed a gas phase containing process gas and a lower boiling fraction taken up by the process gas, and a liquid phase containing higher boiling fraction of said distillation residue, said contacting being at a temperature up to 100° C. above the critical temperature, and
(b) separating the gas phase from the liquid phase, while still maintaining super-critical conditions as aforesaid.

31. A process according to claim 30, comprising the steps of introducing the distillation residue and the process gas continuously into a contacting zone for said contacting and then into a separating zone for said separating so that both the process gas and distillation residue pass in a unidirectional stream through said zones, and intimately mixing the process gas and distillation residue in said contacting zone, and stilling said mixture prior to introduction into the separating zone to facilitate said separation.

32. A process as claimed in claim 31, in which the temperature of contacting is up to 100° C. above the critical temperature of the process gas.

33. A process according to claim 30, the low boiling fraction is condensed from the separated gas phase by reducing the pressure to a sub-critical value sufficiently high to enable the process gas to be liquified by cooling to room temperature.

34. A process as claimed in claim 33, in which propane is used as the process gas.

35. A process according to claim 33, wherein said condensation provides a two phase mixture of condensed low boiling fraction and process gas, said condensate is separated from the two phase mixture and the resulting condensate-free process gas is liquified by cooling and thereafter compressed to the pressure employed in the contacting, and is thereafter heated to the temperature employed in said contacting, said heating including heat exchange with the gas phase resulting from said contacting and said condensate-free process gas.

36. A process as claimed in claim 33, in which the following operating conditions are used
contacting: 100° to 150° C., pressures of at least 100 atmospheres, separating: release of pressure to 30 to 40 atmospheres, liquefaction by cooling to 20° to 30° C.

37. A process according to claim 36, wherein the contacting operating pressure is 100-200 atmospheres.

38. A process as claimed in claim 31, in which the stilled mixture passes obliquely downward into the separation zone from which the gas phase is removed at the top while the liquid phase flows downward and is discharged from the separating zone.

39. A process as claimed in claim 38, in which the temperatures of contacting is up to 50° C. above the critical temperature of the process gas.

40. In a process of catalytic cracking of a petroleum fraction by hydrogenation, the improvement which comprises utilizing as said fraction, material separated by the process of claim 1 from petroleum distillation residue as a lower boiling fraction thereof.

41. Process according to claim 18, wherein said petroleum distillation residue contains an appreciable amount of vanadium compounds, said lower boiling fraction taken up in the gas phase containing not more than a trace of vanadium.

42. Process according to claim 41, condensing at least part of the low boiling fraction from the gas phase by reducing the pressure or increasing the temperature or reducing the pressure and increasing the temperature, to condense lower boiling fraction and provide a two phase mixture of condensed lower boiling fraction and process gas, separating condensed lower boiling fraction from the two phase mixture, and recycling process gas resulting from the separation of the two phase mixture to said contacting of residue and process gas.

* * * * *

UNITED STATES PATENT AND TRADEMARK OFFICE
CERTIFICATE OF CORRECTION

PATENT NO. : 4,201,660
DATED : May 6, 1980
INVENTOR(S) : Kurt Zosel

It is certified that error appears in the above-identified patent and that said Letters Patent are hereby corrected as shown below:

Column 4, line 14, for "sufficiently" read --sufficient--.
Column 5, line 11, for "fow" read --flow--.
Column 5, line 26, for "chargng" read --charging--.
Column 6, line 60, for "separationg" read --separation--.
Column 8, line 9, for "form" read --from--.
Column 8, line 38, for "hase" read --phase--.
Column 9, line 60, for "C." read --C--.
Column 10, line 32, for "C." read --C--.
Column 10, line 57, for "C." read --C--.
Column 11, line 13, for "C." read --C--.
Column 12, line 21, for "C." read --C--.
Column 12, line 45, for "C." read --C--.
Column 12, line 58, for "liquified" read --liquefied--.
Column 13, line 14, for "C." read --C--.

Signed and Sealed this

Seventh Day of October 1980

[SEAL]

Attest:

SIDNEY A. DIAMOND

Attesting Officer

Commissioner of Patents and Trademark